Patented Sept. 10, 1940

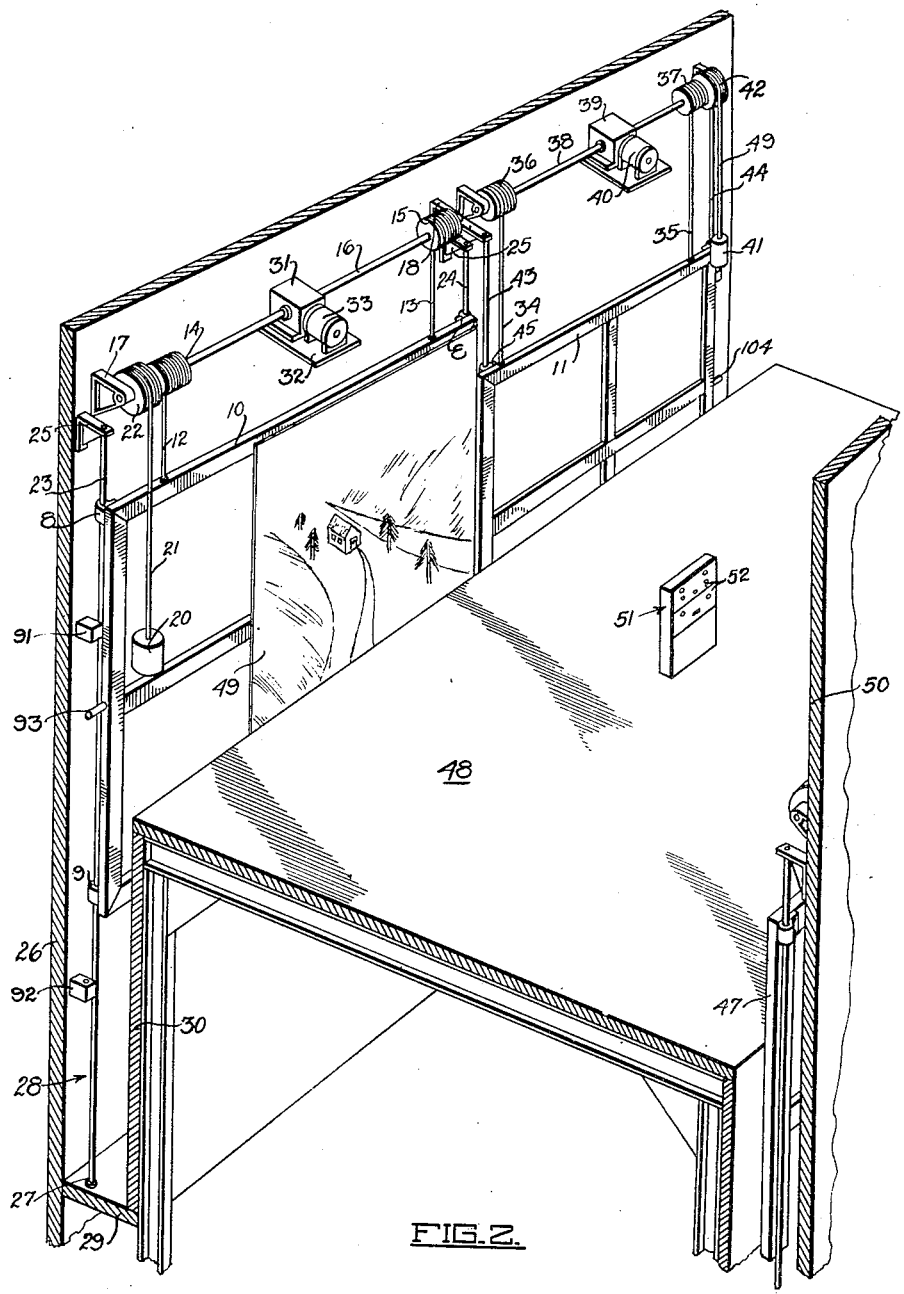

2,214,154

UNITED STATES PATENT OFFICE 2,214,154

ELEVATOR MOTOR SYSTEM

Leland J. Adams, Burbank, Calif., assignor to Warner Bros. Pictures, Inc., New York, N. Y., a corporation of California Application June 30, 1937, Serial No. 151,077

12 Claims. (Cl. 172—293)

This invention relates to control systems for controlling the operation of a plurality of motors either separately or synchronously and has particular reference to a motor system for raising and lowering a plurality of adjacent paint frames either together or separately.

In making large paintings or drawings of the order of fifty feet square or more, it has been found desirable to move the canvas sheets on which the painting is to be done, or the supporting paint frames therefor, vertically in respect to the stand on which the painter is supported whereby the painter may cover the entire area of the sheet. By providing two or more canvas supporting frames side by side in co-planar relation, separate paintings may be simultaneously worked on by different painters or two or more of the frames may be used to simultaneously support a single canvas sheet which is larger than any one of the frames. Where a plurality of such frames carrying a single sheet of canvas are moved vertically to different positions relative to the painting floor or stand, it is necessary that such frames move at exactly the same speed since any relative movement of the frames will tend to rupture, tear, or mis-align the sheets.

The present invention is directed to a motor system for moving such frames and has for an object to control a plurality of motors for operation as induction motors, either separately to separately elevate or lower each paint frame or interlocked to elevate or lower a plurality of paint frames in synchronism. The motor system may be used for other purposes however.

A further object of the invention is to control the reversal of a plurality of such motors either separately or collectively.

A feature of the invention relates to the use of a plurality of polyphase motors having normally set brakes associated therewith to prevent over-running when power is removed. A further object of the invention is to align, by interlocking, such motors having brakes before starting the motors.

The invention contemplates the use of a pair of polyphase motors having their stators connected to a polyphase power current supply line through either of a pair of line switches. Selective operation of either of a pair of control circuits respectively connected to the line switches permits the phase relation of the power current to be changed as desired for ultimate rotation of either or both of the motors in opposite directions.

A secondary control circuit is associated with each of the motors to connect an impedance element in parallel circuit relation with the respective rotor and for simultaneously releasing a formerly set brake associated with the respective motor. The impedance elements, which are preferably resistance elements, cause the motors to run as induction motors with an amount of torque determined by the value of the resistance elements. A third control circuit is provided to prepare the motors for synchronous operation. This circuit, when operated, connects the rotors of the two motors in parallel circuit relation and simultaneously releases one of the brakes whereby the released rotor may align itself with the unreleased rotor through the interlocking thereof before the motors are actually started. This control circuit preferably causes a common control to be instituted for the individual secondary control circuits whereby the individual resistance elements for the respective rotors may all be simultaneously connected to the combined rotor circuit on operation of either of the secondary control circuits. In other words, by closing a common control switch, the start switch for each motor is given control of the start circuit for the other motor, whereby a plurality of paint frames or the like, may be elevated or lowered.

A further feature of the invention relates to the use of a line relay switch which connects the stators of two polyphase motors to a polyphase current supply line in a certain phase relation, and another line relay switch which connects the stators of those motors to the supply line in a different phase relation for rotation in an opposite direction. Each line relay switch is under the control of a switch for its particular motor. A further object of the invention is to prevent the simultaneous closure of both line relay switches through accidental simultaneous closure of the switches therefor, to prevent short circuiting the power line. This is accomplished by a mechanical interlock between the two line relay switches, which insures that one of them shall be held open when the other one is closed, whereby the line relay switch thus opened is removed from the control of its respective start switch.

More particularly describing how the above and other objects of the invention are accomplished, reference is had to the accompanying drawings wherein:

Fig. 2 is a perspective view of a paint frame assembly.

Figure 1:
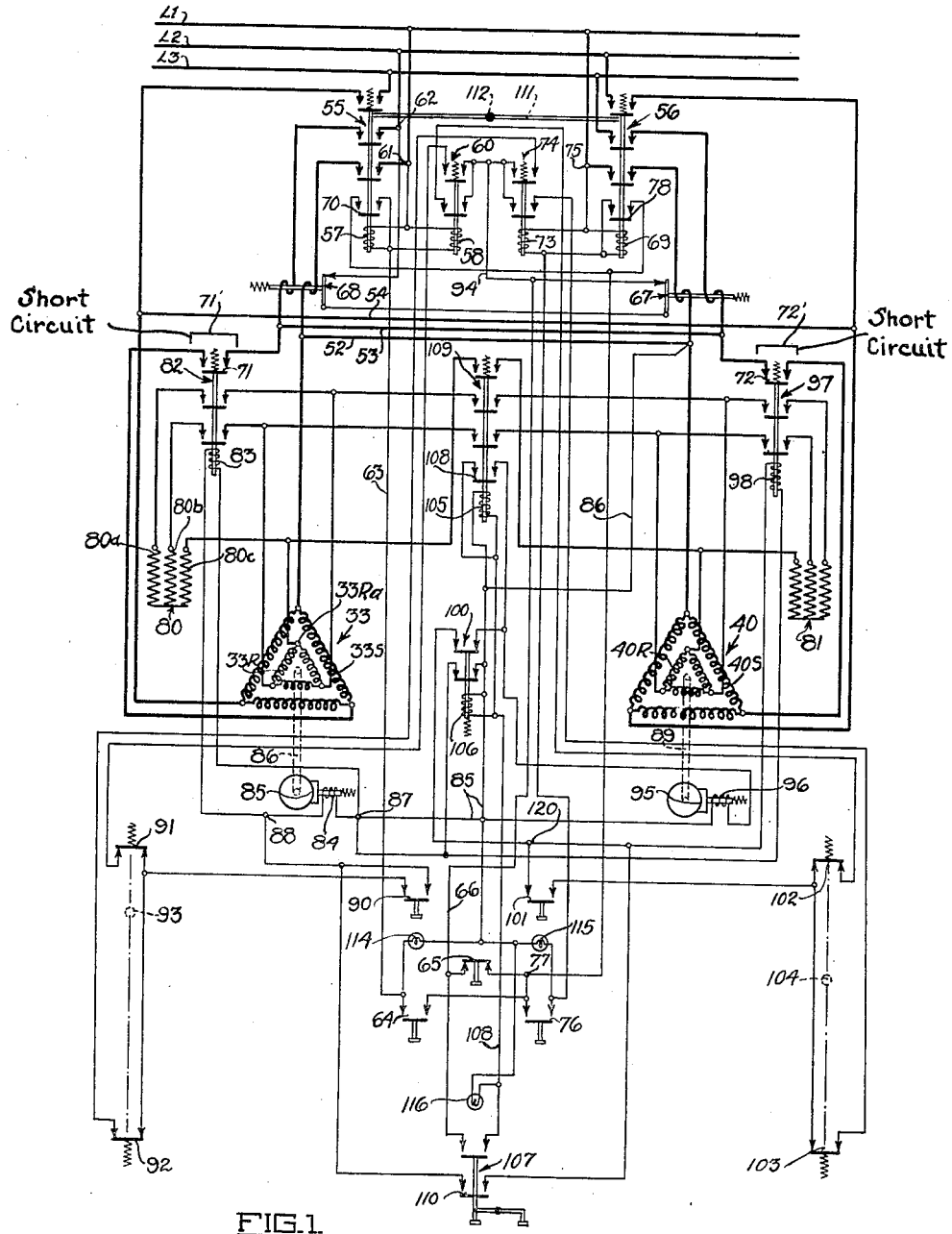
Fig. 1 is a circuit diagram of the motor control system.

Referring to Fig. 2, a pair of paint frames 10 and 11, each of the order of fifty feet square, are provided side by side in co-planar relation. The frame 10 is supported by a pair of spaced cables 12 and 13 wrapped at their upper ends around a pair of cable drums 14 and 15, respectively. These drums 14 and 15 are secured to a longitudinally extending drive shaft 16 which is rotatably journalled at either end thereof within bearings provided in bearing brackets 17 and 18. A counter-weight 20 is supported by a cable 21 wrapped around a drum 22 also carried by the shaft 16. Cable 20 is wrapped around drum 22 in a direction opposite to that of cables 12 and 13. The frame 10 is guided against transverse movement by a pair of tightly stretched cables 23 and 24 provided adjacent either end of the frame and secured at their upper ends by brackets 25 extending from a wall 26. The lower ends of the cables 23 and 24 are secured at 27 to the bottom wall 29 of a well 28 formed by the vertical wall 26 and a second parallel wall 30. A pair of guides 8 and 9 at the upper and lower ends of each side edge of frame 10 surround cables 23 and 24 and are slidably guided thereby.

The shaft 16 is driven through a suitable reduction gear transmission generally indicated at 31 by a three phase motor 33. The motor 33 and its gear transmission 31 are supported upon a platform 32 which is suitably secured in a horizontal position in any manner as by suspending the same from the beams of an overhead truss (not shown).

The frame 11 is supported and moved by an arrangement identical with that for frame 10, comprising a pair of lifting cables 34 and 35 wrapped around drums 36 and 37 secured upon a drive shaft 38 which is driven through a reduction gear transmission generally indicated at 39 by a second three phase motor 40. A counterbalance 41 is carried by a cable 40 which is wrapped around a drum 42 also carried by the shaft 38 to counterbalance the weight of the frame 11. Frame 11 is guided against transverse movement by guides 45 which surround and are slidably guided by vertically extending cables 43 and 44 secured at either end thereof in a manner similar to those of 23 and 24.

A second unit comprising a pair of adjacent paint frames, one of which is shown at 47, is provided on the opposite side of a room formed by the wall member 26, a paint stand or floor 48, and a second wall 50 parallel to that of 26. The second unit is identical with the first unit described, both of these units being controlled from a single control unit 51 positioned centrally of the paint floor 48. This unit 51 comprises a pair of control panels positioned on opposite sides thereof, one panel of which is shown at 52. The panel 52 controls the movement of the paint frames 10 and 11 of the first unit whereby the operator may view both the control panel and the frames controlled thereby simultaneously.

Referring to the motor control system shown diagrammatically in Fig. 1, the motors 33 and 40 are of three phase synchronous type, each comprising a three phase stator winding, a three phase rotor winding, and a resistance adapted to be connected in parallel circuit relation to the rotor winding whereby each motor may be made to develop torque as an induction motor. Also the rotors are adapted to be connected in parallel with each other so as to operate as interlock motors for synchronous rotation when it is desired to raise and lower the paint frames 10 and 11 side by side in synchronism. It is believed to be unnecessary to describe the fundamental operation of motors, either singly as induction motors or together as interlocking induction motors, since the underlying principle of operation thereof is well known in the art.

The stator windings 33S and 40S of the two motors 33 and 40, respectively, are connected in parallel circuit relation with each other through conductors 52, 53 and 54. A three phase current supply line comprising conductors L1, L2 and L3 is adapted to be selectively connected in either of two different phase relations with the stator windings of the two motors through either of two normally open relay switches 55 and 56, respectively, whereby the motors may be driven in opposite directions, the relay 55 supplying current in such a phase relation to the stators of both motors 33 and 40 as to cause an ultimate upward movement of either or both of the associated frames 10 and 11 when either or both of the motors respectively are energized, while the other contact 56 supplies current in a different phase relation to the motor stators so as to cause an ultimate downward movement of the frames when the motors are energized.

The energizing coil 57 of relay 55 is connected in parallel with the coil 58 of a normally open preparatory relay switch 60, and in series with an "up" control circuit having its terminals 61 and 62 connected to the power lines L1 and L2, respectively. The "up" control circuit also includes in series a conductor 63, a normally open relay energizing push button switch 64, a normally closed "off" switch 65, a conductor 66, a circuit breaker 67, and a second circuit breaker 68.

The energizing conductors of the circuit breaker 68 are provided in series with two of the stator lines leading from lines L1 and L2 and are situated between the relay 55 and the stator windings of the two motors. The energizing conductors of the circuit breaker 67 are provided in series with two of the stator lines leading from lines L1 and L3 and are situated between the relay 56 and the stator windings. These circuit breakers are adapted to open the circuit, controlled thereby when an overload or short circuit occurs across the stator windings. These circuit breakers may be either of the normally closed electromagnetic type or of the normally closed thermostatic type which depends on an overheating of the conductors therefor for opening the circuit.

Upon closing the switch 64 the "up" circuit is completed to energize the coils 57 and 58 and thereby close the two relays 55 and 60, thus causing the stators of the two motors 33 and 40 to be energized in such a phase relation as to cause ultimate operation of one or both of the motors to raise either or both of the frames 10 and 11 when further circuits hereinafter described are closed. The foregoing operation is based on the assumption that contact switches 71 and 72, each in series with one of the stator conductors of the motors 33 and 40, respectively, are short circuited by suitable straps indicated by the dotted lines 71' and 72' respectively, as will be described hereinafter.

The "up" control circuit is retained in a closed condition after being completed by the switch 64 through a contact switch 70 provided on relay 55, which switch 70 is connected across the switch 64. Opening the "up" control circuit and consequently opening the stator supply lines is effected by opening either the "off" switch 65 or either of the circuit breakers 67 and 68.

The relay 56 for energizing the stators 33S and 40S for ultimate rotation of either or both motors in such a direction as to cause the associated frames to move downward, is controlled through a "down" control circuit similar to the "up" control circuit for the relay 55 and includes therein the energizing coil 69 of relay 56 and the energizing coil 73 of a normally open preparatory relay switch 74, both coils being connected in parallel with each other. This "down" control circuit has one of its terminals at 75 connected to the power line L1 and includes, in series, a normally open energizing push button switch 76. Switch 76 is connected at 77 to a portion of the "up" control circuit including, in series, the "off" switch 65, conductor 66, and circuit breakers 67 and 68 to L2 for completion of the "down" circuit. A contact switch 78 provided on the relay 56 is connected across the circuit closing switch 76 to retain the "down" control circuit in a closed condition after the relay switch 56 has been energized by closing switch 76.

Impedance elements preferably in the form of resistances 80 and 81 are adapted to be connected in parallel circuit relation with the rotors 33R and 40R, respectively, to cause these motors to develop torque as induction motors. These resistance elements are preadjusted in resistance value to cause a sufficient torque to be developed in the rotors 33R and 40R while permitting an interlocking action between the two rotors when they are connected in parallel. Resistance 80 consists of three sections 80a, 80b, and 80c arranged in a Y connection, section 80c being directly connected to one terminal 33Ra of the rotor 33R. The remaining two sections 80a and 80b are connected to corresponding terminals on the rotor 33R through a normally open starting relay switch 82. The energizing coil 83 of relay 82 is connected in parallel with the release energizing coil 84 of a normally set brake 85 connected to the motor shaft 86 of motor 33. One side of these coils 83 and 84 is connected at 87 to a conductor 85 which in turn is connected in series to a conductor 86. Conductor 86 is connected to line L1 through either of the relays 55 or 56, depending on which relay has been previously closed. The other side of each of the coils 83 and 84 is connected at 88 to a normally open push button type start switch 90 for motor 33. Switch 90 when closed completes the start or secondary circuit from line L1 through the relay and brake coils 83 and 84, respectively, to the line L2 through either an upper limit switch 91 or a lower limit switch 92. Switches 91 and 92 are normally closed and are adapted to be opened by a suitable projection 93 on frame 10 at the upper and lower limits of travel of the frame 10, respectively. When relays 55 and 60 are closed to set the stator windings for rotation in such a direction as to raise the frame 10, the starting circuit is completed through upper limit switch 91, through relay 60, conductor 94, and circuit breakers 67 and 68, to the line L2. Assuming the "up" control circuit to be energized when the switch 90 is closed, the brake 85 will be released and the resistance 80 will simultaneously be connected in parallel with the rotor winding 33R to cause rotation thereof to raise the frame 10 upwardly. Rotation of motor 33 will continue until either the switch 90 is allowed to open or the frame 10 reaches its upper limit of travel at which point the switch 91 will be opened by the projection 93 on frame 10. In the event that the motor 33 is set to move the frame 10 downward by closing switch 76 to operate relays 56 and 74 the rotor energizing circuit will be closed through the same start switch 90 but will be connected to the line L2 through the lower limit switch 92, relay 74, conductor 94, and circuit breakers 67 and 68.

Opening either switch 90 or 91 will cause the rotor energizing circuit when connected therethrough to be opened to set the brake 85 and disconnect the resistance 80 from rotor 33.

Motor 40 has a normally set brake 95 similar to that of 85, connected to the motor shaft 89 thereof, which brake is adapted to be released by energization of a coil 96 associated therewith. The resistance 81 is adapted to be connected in parallel circuit relation with the rotor 40R through a normally open starting relay switch 97 when closed, in a manner similar to that of resistance 80. When the motor 40 is to be operated separately, the energizing coil 98 of relay 97 and the brake release energizing coil 96 are connected in parallel with each other by means of a normally closed relay 100. One side of each of coils 96 and 98 is connected to line L1 through conductors 85 and 86, and either of the relays 55 or 56 depending upon which relay is closed. The other side of coils 96 and 98 is connected at 120 to a normally open pushbutton type start switch 101. The starting or secondary circuit for motor 40 is completed from switch 101 to line L2 through either of a pair of normally closed upper and lower limit switches 102 and 103, respectively, these switches being adapted to be opened by a projection 104 on frame 11 at the upper and lower limits of travel, respectively, of frame 11. If the "up" relay 55 and its associated preparatory relay 60 are closed, the start energizing circuit from switch 101 is completed through the upper limit switch 102, relay 60, conductor 94, circuit breakers 67 and 68 to line L2. However, if the "down" relay 56 and its associated preparatory relay 74 are closed, the circuit from switch 101 is closed through the lower limit switch 103, relay 74, line 94, and circuit breakers 67 and 68 to line L2.

In the event that it is desired to operate the two motors 33 and 40 in synchronism to cause the frames 10 and 11 to move up or down together the desired relay 55 or 56 is closed in the manner hereinbefore described by its respective control switch 64 or 76 so as to energize the three phase stator windings 33S and 40S in the phase relation necessary for the desired direction of rotation. The two rotors are connected in parallel circuit relation with each other to interlock and align the same by a normally open relay switch 109. The energizing coil 105 of relay 109 is connected in parallel with the energizing coil 106 of a normally closed relay 100. Coils 105 and 106 are adapted to be energized by a dual control circuit comprising a double throw switch 107 which is adapted to be held in either an open or a closed position. One side of each of the coils 105 and 106 is connected by conductor 86 to line L1 through either of relays 55 or 56. The other side of each of the coils 105 and 106 is connected by a conductor 108 to the switch 107. Switch 107 is connected on closure thereof to line L2 through conductor 66 and circuit breakers 67 and 68 to close the dual control circuit, and thereby to close the relay 109 and simultaneously open the relay 100.

It will be noted that when the contact relay 109 is closed by closing the dual control switch 107, the energizing coil 96 of brake 95 will be connected in parallel with the coils 105 and 106 of relays 109 and 100, respectively, by a contact switch 108 on relay 109. Energization of the brake coil 96 will cause brake 95 to be released permitting the interlocked rotor 40R to align itself in correct relation to the set position of rotor 33R. It is to be understood that in the above condition the brake 85 remains in a set condition to hold the rotor 33R from movement. Furthermore, the rotor 40R will be restrained from any movement other than that required to align itself with rotor 33R, this restraining action resulting from the interlocked condition of the two rotors 33R and 40R. Thus the two rotors will be allowed to become interlocked and aligned with each other before starting thereof while being restrained from movement by any outside load such as that of the frames 10 and 11.

Starting of the interlocked motors is effected by closing either of the start switches 90 and 101 to connect the resistances 80 and 81 in parallel with the rotor circuits of rotors 33R and 40R. It will be noted that the coils 83 and 98 of the rotor relays 82 and 97, respectively, are connected in parallel with each other through the contact 110 of the dual control switch 107. One side of each of the relay coils 83 and 98, as well as the release energizing coil 84 of brake 85, is connected through conductors 85 and 86 to line L1 through either of the relays 55 or 56 depending on which is in a closed condition. Closing of switch 90 will complete the rotor energizing circuit from the opposite side of each of the coils 83, 98 and 84, through switch 91, if the frames are being raised, or through switch 92 if the frames are being lowered, to line L2 in a manner described hereinbefore. If switch 101 is closed instead of switch 90 to complete the rotor energizing circuit between lines L1 and L2, the circuit will include either of the limit switches 102 and 103 instead of the switches 91 and 92.

It will be understood that the hereinbefore described arrangement for supplying three phase current to the stator windings 33S and 40S of the two motors 33 and 40, respectively, is adapted to apply all three phases of current simultaneously to such windings 33S and 40S. This arrangement is desirable when operating the two motors synchronously in cases where there is sufficient load upon the motors or friction in the various reduction gears and other driving elements to prevent the motors when being interlocked, from spinning or jumping past their aligned positions, due to the torque impulse developed to produce alignment of the two rotors 33R and 40R before the application of the resistances 80 and 81. However, in the event that the friction or other load on the motors is so slight as to permit spinning of the rotors 33R and 40R while being interlocked together, the short circuiting straps 71' and 72' across the contacts 71 and 72 of relays 82 and 97, respectively, are removed. In this condition the closing of either relay 55 or 56 will cause only two lines from the three phase power supply circuit to be connected to the stators 33S and 40S. Thus only one side of each of the stators will be energized which will be insufficient, when the rotors 33R and 40R are interlocked, to permit over-running or spinning of these rotors. The third line from the three phase power circuit will be later connected to the corresponding side of the stator windings to complete the stator circuit on closing the relays 82 and 97 to connect the resistances 80 and 81 in circuit with the rotors.

If the "up" switch 64 and the "down" switch 76 are accidentally closed at the same time, this would operate both of the relays 55 and 56 to short circuit the line. The simultaneous closing of relays 55 and 56 is prevented by means of a mechanical interlocking device which permits only one of these relays, 55 and 56, to close at one time. This interlocking device comprises a lever 111 pivotally supported at 112, and pivotally connected at either end to the switch arms of relays 55 and 56, respectively.

Lamps 114 and 115 are connected in circuit with the "up" and "down" switches 64 and 76, respectively, to indicate the conditions of the "up" and "down" energizing circuits, respectively. A third lamp 116 is connected in circuit with the dual control switch 107 to indicate the condition of the circuit controlled thereby.

In reference to the operation of the motor system; when a relatively small painting is to be made, that is, one which is not larger than any one of the paint frames, as that shown at 49, it is supported on a single paint frame thereby permitting another painting to be simultaneously made and separately raised or lowered on the adjoining frame. In the above case the motors will be operated separately. This is accomplished by first closing either of the switches 64 or 76 to close its respective relay 55 or 56, thus setting the stator circuits for ultimate rotation of either motor in the desired direction. Either of the start switches 90 or 101 is then closed to start and run its respective motor 33 or 40, to move its respective frame until such start switch is allowed to open.

In the event that it is desired to make a painting which is larger than any one of the frames, the two frames are brought into alignment by raising or lowering either of the frames as hereinbefore described. The dual control switch 107 is closed next to interlock the motors 33 and 40 and to simultaneously release the brake 95 of motor 40 to align the rotors 33R and 40R. This closing of switch 107 is preferably accomplished before the sheet on which the painting is to be made is secured to the frames, thereby preventing any later relative shift between the two frames due to the aligning of one of the rotors with the other when interlocked. However, if the ratio of movement between the motors and their respective frames is relatively large so as to produce a negligible relative shift between the two adjacent frames when the motor rotors are aligned with each other through the interlocking operation, it is immaterial whether the painting sheet is secured to the two frames before or after interlocking the rotors. The last operation in starting and running the two motors 33 and 40 in synchronism is to close either of the start switches 90 or 101, thus connecting both resistances 80 and 81 in parallel circuit relation with the rotors 33R and 40R and simultaneously releasing the remaining set brake 85. The motors continue to run in synchronism until the closed start switch is released (or until one of the circuit breakers or limit switches is opened).

Having thus described the invention, what is claimed as new and desired to be secured by Letters Patent is:

1. A motor system comprising the combination of a pair of polyphase motors each having a rotor and stator, a pair of resistance elements, circuit means for connecting said resistance elements in parallel with each other and with the rotors of said motors, and circuit connections for connecting each rotor of said motors with only one of said resistance elements.

2. A motor system according to claim 1 wherein circuit connections are provided for reversing the direction of rotation of said motors, both separately and collectively.

3. A motor system comprising the combination of a pair of polyphase motors each having a stator and a rotor, a line switch for supplying polyphase current of a certain phase relation to said stators, a second line switch for supplying polyphase current of a different phase relation to said stators, a resistance for each of said rotors, a control switch for each of said motors and connections controlled thereby for closing its respective line switch and for preparing a control circuit for its respective rotor, and a start switch and circuits controlled thereby for each of said motors for completing its respective said control circuit and for controlling the connection of one of said resistance elements to its respective rotor.

4. A motor system according to claim 3 which comprises a dual control switch and circuits controlled thereby for connecting said resistance elements in parallel with each other and with the rotors of said motors.

5. A motor system comprising the combination of a pair of polyphase motors having rotor and stator windings, a pair of normally set brakes operatively connected to said motors respectively, supply leads for said stator windings, switch means adapted to connect said rotor windings in parallel circuit relation to insure synchronous operation of said motors, means responsive to the closing of said switch means for releasing one of said brakes, resistance elements, switch means adapted to connect said resistance elements in parallel circuit relation with said rotor windings, and means responsive to said last mentioned switch means for releasing the other of said brakes.

6. A motor system comprising the combination of a pair of polyphase motors having rotor and stator windings, a pair of normally set brakes operatively connected to said motors, respectively, supply leads for said stator windings, resistance elements, switch means for each of said motors and adapted to connect said resistance elements in parallel circuit relation to the rotor windings of the respective motor for individual operation of said motors, means responsive to the closing of said switch means for releasing the respective brakes, switch means adapted to connect said rotor windings in parallel circuit relation with said resistance elements for synchronous operation of said motors, and means responsive to the closing of said last mentioned switch means for releasing the remaining set brake.

7. A motor system comprising the combination of a polyphase motor having a rotor and a stator, switch means and a circuit therefor for supplying single phase current to said stator and for preparing a polyphase power circuit having a certain phase relation and a start circuit, a second switch means and circuit therefor for supplying single phase current to said stator and for preparing a polyphase power circuit having a different phase relation and second start circuit, a resistance element, and switch means and connections therefor in both of said start circuits for connecting said resistance element with said rotor, and for completing the connection of one of said power circuits with said stator.

8. A motor system comprising the combination of a pair of three phase motors, each having a rotor and a stator, said stators being connected in parallel circuit relation, switch means and a circuit therefor for supplying single phase current to said stators and for preparing a polyphase power circuit having a certain phase relation and a secondary circuit, a second switch means and a circuit therefor for supplying single phase current to said stators and for preparing a polyphase power circuit having a different phase relation and a second secondary circuit, a resistance element for each of said rotors, switch means and connections therefor in both of said secondary circuits and individual to each of said motors for connecting one of said rotors with its respective resistance element and for controlling connection of its respective stator to one of said power circuits.

9. In a motor system, the combination of a pair of polyphase motors each having a rotor and a stator, means for supplying polyphase current to said stators, a pair of resistance elements, switch means and circuit connections therefor for connecting one of said resistance elements only to one of said rotors, switch means and connections therefor for connecting the other of said resistance elements only to the other of said rotors, switch means and circuit connections therefor for connecting said rotors in parallel circuit relation and for connecting said first and second mentioned switch means in parallel circuit relation whereby both of said motors may be operated by either of said first and second mentioned switch means.

10. A motor system comprising the combination of a three phase motor having a wound rotor and a stator, a line switch for connecting two sides of a three phase line to said stator, a resistance network, an auxiliary switch for connecting the third side of said line to said stator and for connecting said resistance network to said rotor, and means for operating said auxiliary switch.

11. Plural motor control system comprising the combination of two polyphase induction elevator motors, each having a stator, a rotor, and a resistance network, a polyphase power circuit for said motors, an "up" switch and connections therefor for supplying single phase current from said power circuit to the stators of both of said motors and for preparing connection of said power circuit to said stators for "up" operation, a "down" switch and connections therefor for supplying single phase current from said power circuit to the stators of both of said motors and for preparing connection of said power circuit to said stators for "down" operation; a "start" switch and connections therefor for each of said motors and operative, when either said "up" switch or said "down" switch is operated, to (a) complete the connection of said power circuit to its respective stator for "up" or "down" operation, respectively, and (b) connect one of said resistance networks to the rotor of said respective stator, whereby said motors may be operated one at a time "up" or "down"; and a common control switch and connections therefor for interlocking said rotors for synchronous operation, and connections whereby either of said start switches is operative when said "up" or said "down" switch and said common control switch are operated, to connect said resistance networks to the rotors of said motors and cause synchronous operation of said motors "up" or "down," respectively.

12. Plural motor control system comprising the combination of a pair of polyphase induction elevator motors, each having a stator, a rotor, a brake, and a resistance network, means for supplying polyphase current to said stators, a switch and circuit connections therefor individual to each of said motors for connecting one of said resistance networks to the respective rotor and for releasing the brake of the respective motor for single motor operation, and switch means and connections therefor for interlocking said rotors for synchronous operation and releasing one of said brakes.

LELAND J. ADAMS.